US011996725B1

(12) United States Patent
Salter et al.

(10) Patent No.: US 11,996,725 B1
(45) Date of Patent: May 28, 2024

(54) ELECTRIC POWER TAKE-OFF

(71) Applicant: Ford Global Technologies, LLC, Dearborn, MI (US)

(72) Inventors: Stuart C. Salter, White Lake, MI (US); Toussaint Carpenter, Westland, MI (US); Brendan Francis Diamond, Grosse Pointe, MI (US); Ryan O'Gorman, Beverly Hills, MI (US); David Celinske, Wolverine Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 35 days.

(21) Appl. No.: 18/153,526

(22) Filed: Jan. 12, 2023

(51) Int. Cl.
*H02J 7/00* (2006.01)

(52) U.S. Cl.
CPC ........ *H02J 7/00712* (2020.01); *H02J 7/0048* (2020.01); *H02J 7/0063* (2013.01); *H02J 2207/20* (2020.01)

(58) Field of Classification Search
CPC .... H02J 7/00712; H02J 7/0048; H02J 7/0063; H02J 2207/20; H02J 7/00
See application file for complete search history.

(56) References Cited

U.S. PATENT DOCUMENTS

| | | |
|---|---|---|
| 8,295,950 B1 | 10/2012 | Wordsworth et al. |
| 2018/0141438 A1 | 5/2018 | Sakai et al. |
| 2020/0298705 A1 | 9/2020 | Gaither et al. |
| 2021/0379996 A1 | 12/2021 | Mosebach |

FOREIGN PATENT DOCUMENTS

WO 2021004639 A1 1/2021

*Primary Examiner* — Robert L Deberadinis
(74) *Attorney, Agent, or Firm* — Frank Lollo; Bejin Bieneman PLC

(57) ABSTRACT

A system and method for providing electric power take-off from a high-voltage electric battery to a plurality of external devices includes: receiving a first request from a first external device having a first priority for a supply of power from an electric power take-off connector at a first voltage, a first current, and a first variance tolerance; receiving a second request from a second external device having a second priority for supply of power at a second voltage, a second current, and a second variance tolerance; and assigning available power from the high-voltage battery, via a high voltage (HV) variable direct-current to direct-current (DCDC) converter and a current regulator in electrical communication with the high-voltage battery, to the first and second external devices based upon their respective priorities and variance tolerances.

20 Claims, 3 Drawing Sheets

ELECTRIC POWER TAKE-OFF

BACKGROUND

A power take-off is a device that transfers an internal combustion engine's mechanical power to another piece of equipment, such as a lift or conveyor. A common power take-off device includes a shaft having a splined end to connect to the piece of equipment.

Hybrid and electric vehicles can also include an electric power take-off has developed. For example, a battery-driven electric motor has been used to drive a splined shaft to provide one form of an electric power take-off.

DETAILED DESCRIPTION

Figure 1:
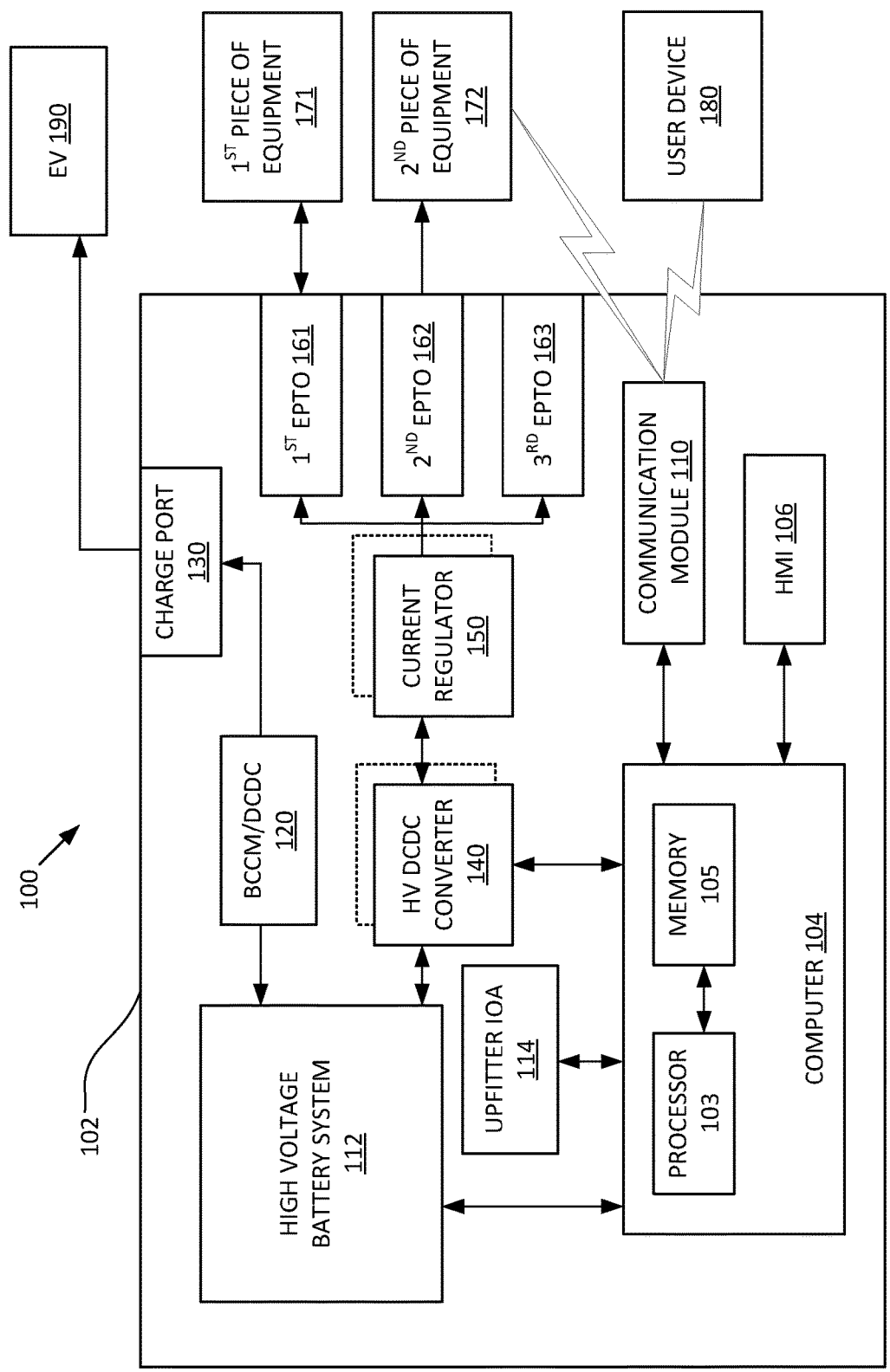
FIG. 1 illustrates an example of an example system for providing an electric power take-off.

In accordance with the present disclosure, an electric power take-off is provided that can deliver power to multiple external devices (i.e., pieces of equipment) from a high-voltage (HV) vehicle battery by prioritizing the power delivery based upon a priority level and a variance tolerance of the piece of equipment.

In one or more implementations of the present disclosure, a system may include a computing device having a processor and a memory, wherein the memory stores instructions executable by the processor such that the computing device is programmed to: receive a first request from a first external device having a first priority for supply of power from an electric power take-off connector at a first voltage, a first current, and a first variance tolerance; receive a second request from a second external device having a second priority for supply of power at a second voltage, second current, and a second variance tolerance; and assign available power from a high-voltage electric battery, via a high voltage (HV) variable direct-current to direct-current (DCDC) converter and a current regulator, to the first and second external devices based upon their respective priorities and variance tolerances.

In an implementation, the system may include instructions executable by the processor such that the computing device is programmed to determine a range of voltage and current available from the high-voltage electric battery, a state of charge (SOC) of the high-voltage electric battery, and a boost/buck capability of the HV variable DCDC converter.

In another implementation, respective priorities may be determined based upon a criteria including a user-assigned priority, a device-assigned priority, or first-come first-served priority.

In yet another implementation, the system may further include instructions executable by the processor such that the computing device is programmed to ping the first and second external devices in order to receive the first and second requests.

In another implementation, the system may further include instructions executable by the processor such that the computing device is programmed assign available power to the first and second external devices sequentially.

In an implementation, a first electric power take-off connector may be provided for the first external device and a second electric power take-off connector may be provided for the second external device, and the system may further include instructions executable by the processor such that the computing device is programmed to assign available power to the first and second external devices concurrently when the first voltage and the second voltage are identical.

In another implementation, data may be exchanged with external devices wirelessly.

In yet another implementation, data may be exchanged with external devices over a controller area network (CAN) or Ethernet.

In an implementation, the HV variable DCDC converter may operate between 12 volts and 800 volts.

In yet another implementation, the instructions executable by the processor may be programmed to arbitrate available power to the first external device using the HV variable DCDC converter and the current regulator and to the second external device using a second HV variable DCDC converter and a second current regulator.

In one or more implementations of the present disclosure, a method may include: receiving a first request from a first external device having a first priority for a supply of power from an electric power take-off connector at a first voltage, a first current, and a first variance tolerance; receiving a second request from a second external device having a second priority for supply of power at a second voltage, a second current, and a second variance tolerance; and assigning available power from a high-voltage battery, via a high voltage (HV) variable direct-current to direct-current (DCDC) converter and a current regulator in electrical communication with the high-voltage battery, to the first and second external devices based upon their respective priorities and variance tolerances.

In an implementation, the method may further include determining a range of voltage and current available from the high-voltage electric battery, a state of charge (SOC) of the high-voltage electric battery, and a boost/buck capability of the HV variable DCDC converter.

In another implementation, respective priorities may be determined based upon a criteria including a user-assigned priority, a device-assigned priority, or first-come first-served priority.

In yet another implementation, the method may further include pinging the first and second external devices in order to receive the first and second requests.

In another implementation, the method may further include assigning available power to the first and second external devices sequentially.

In yet another implementation, the method may further include providing a first electric power take-off connector for the first external device and a second electric power take-off connector for the second external device, and assigning available power to the first and second external devices concurrently when the first voltage and the second voltage are identical.

In an implementation of the method, data may be exchanged with external devices wirelessly.

In another implementation of the method, data may be exchanged with external devices over a controller area network (CAN) or Ethernet.

In yet another implementation of the method, the HV variable DCDC converter may operate between 12 volts and 800 volts.

In an implementation, the method may arbitrate available power to the first external device using the HV variable DCDC converter and the current regulator and to the second external device using a second HV variable DCDC converter and a second current regulator.

With reference to FIG. 1, a system 100 can be used to provide power from a vehicle 102 to various pieces of equipment. The vehicle 102 may be a ground vehicle having a hybrid or electric motor and a high-voltage (HV) battery system 112, an unpowered ground vehicle (e.g., trailer) or waterborne vessel (e.g., barge) having a HV battery system 112, or a waterborne vehicle having a hybrid or electric motor and a HV battery system 112.

The HV battery system 112 includes a HV battery with a plurality of cells and a bus, measurement apparatus for determining the state of charge (SOC), and may include other associated equipment, such as a thermal control system, current measuring circuitry, control circuitry, switching circuitry, and the like. The HV battery may, for example, be an 800 V traction battery with a 20 kW capacity.

The HV battery of the HV battery system 112 may be charged through a charge port 130. The charge port 130 may, for example, be a standard SAE charge port and may support various DC fast charging standards. A battery charge control module (BCCM)/direct-current to direct-current (DCDC) converter 120 may control charging of the HV battery system 112 from a charging source (not shown) in a first direction, and may operate in the opposite direction to charge another electric vehicle (EV) 190 from the HV battery system 112. For example, the EV 190 may be a BEV skid loader at a jobsite.

The vehicle 102 also includes a computer 104 having a processor 103 connected to a memory 105. The memory 105 can include one or more forms of computer readable media, and stores instructions executable by processor 103 for performing various operations, including as disclosed herein. For example, the computer 104 can be a generic computer with a processor and memory as described above and/or an ECU, controller, or the like for a specific function or set of functions, and/or a dedicated electronic circuit including an ASIC that is manufactured for a particular operation, e.g., an ASIC for processing sensor data and/or communicating the sensor data. In another example, computer 104 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in a computer.

The memory 105 can be of any suitable type, e.g., EEPROM, EPROM, ROM, Flash, hard disk drives, solid state drives, servers, or any volatile or non-volatile media. The memory 105 can store data. The memory 105 can be integrated with or a separate device from the processor 103 or computer 104, and the processor 103/computer 104 can retrieve information stored in the memory 105, e.g., can obtain data to be stored via a vehicle network in the vehicle 102, e.g., over an Ethernet bus, a CAN bus, a wireless network, etc. Alternatively, or additionally, the memory 105 can be part of the computer 104, i.e., as a memory of the computer 104 or firmware of a programmable chip.

The vehicle 102 may include a network via which messages can be exchanged between various devices in vehicle 102, as indicated by various arrows in FIG. 1. The computer 104 can be generally programmed to send and/or receive, via the vehicle network, messages to and/or from other devices in vehicle 102, e.g., any or all of sensors, actuators, components, a communications module 110, a human machine interface (HMI) 106, etc. Additionally, or alternatively, messages can be exchanged among various such other devices in vehicle 102 via the vehicle network. In cases in which the computer 104 includes a plurality of devices, a vehicle network may be used for communications between devices represented as a computer 104 in this disclosure. In some implementations, the vehicle network can be a network in which messages are conveyed via a vehicle 102 communications bus. For example, the vehicle network can include a controller area network (CAN) in which messages are conveyed via a CAN bus, or a local interconnect network (LIN) in which messages are conveyed via a LIN bus. In some implementations, the vehicle network can include a network in which messages are conveyed using other wired communication technologies and/or wireless communication technologies e.g., Ethernet, WiFi, Bluetooth, Ultra-Wide Band (UWB), etc. Additional examples of protocols that may be used for communications over the vehicle network in some implementations include, without limitation, Media Oriented System Transport (MOST), Time-Triggered Protocol TTP, and FlexRay. In some implementations, the vehicle network can represent a combination of multiple networks, possibly of different types, that support communications among devices in vehicle 102. For example, the vehicle network can include a CAN in which some devices in vehicle 102 communicate via a CAN bus, and a wired or wireless local area network in which some device in vehicle 102 communicate according to Ethernet or WI-FI communication protocols.

The HMI 106 may include, for example, a touch screen with menus for a user to provide information to computer 104 such as, for example, a request for use of an electronic power take-off (EPTO) connector to provide electric power to a piece of equipment, such as a lift, a conveyor, a dump, a refrigerator, an oven, a post hole digger, a compressor, a crane, a bucket, a power tool, etc., as discussed further below. Alternately or additionally, the HMI 106 may have a keypad for entry of data. Alternately or additionally, the HMI 106 may be provided in a cab of vehicle 102 and/or may be provided adjacent an EPTO connection point.

The vehicle 102 can include the communication module 110 to provide communications with devices and/or networks not included as part of the vehicle 102, such as a wide area network (not shown), and/or user devices 180, and/or external devices such as first and second pieces of equipment 171, 172, for example. The communication module 110 may include one or more mechanisms by which a computer 104 may communicate, including any desired combination of wireless e.g., cellular, wireless, satellite, microwave and radio frequency communication mechanisms and any desired network topology or topologies when a plurality of communication mechanisms are utilized. Exemplary communications provided via the module can include cellular, Bluetooth, IEEE 802.11, DSRC, cellular V2X, CV2X, and the like.

In an implementation, vehicle 102 can include an interface module such as an upfitter input/output adapter (IOA) 114. The upfitter IOA 114 can have a connection to a CAN bus and/or Ethernet network within the vehicle 102 and permits upfitter devices to interface with the EPTO features through the control logic in computer 104. Upfitter devices are equipment added or connected to a vehicle chassis following original manufacture of the vehicle, such as but not limited to an accessibility lift, kitchen equipment (e.g., in a food truck), appliances (e.g., added to a recreational vehicle), a utility truck bucket, a conveyor, a mulcher/grinder or posthole digger, a dump or plow, and a ramp or winch lift.

In an implementation, the vehicle 102 can include a single HV variable DCDC converter 140 and a single current regulator 150 that are in electrical communication with the HV battery system 112, and which are switchably connected to at least a first EPTO 161 connector to supply electric power to at least a first piece of equipment 171. In an implementation, multiple EPTO connections (for example, second EPTO 162 connector, third EPTO 163 connector, etc.) may be provided at multiple locations on vehicle 102 (for example, a rear cab position, a rear bumper position, a front bumper position, a side bed position, etc). The multiple EPTO connections may be switchably connected to the single HV variable DCDC converter 140 and the single current regulator 150 to provide power to either a single EPTO connection or a plurality of EPTO connections in a sequential manner, as described further below.

In an implementation where the first and second pieces of equipment 171, 172 request the same voltage, the first and second EPTO 161, 162 connections may be provided with the voltage by the single HV variable DCDC converter 140 and the single current regulator 150 at a sufficient current to operate the first and second pieces of equipment 171, 172 simultaneously.

In another implementation, the vehicle 102 may be provided with multiple HV variable DCDC converters 140 and current regulators 150, as per the dotted outlines in FIG. 1. The various HV variable DCDC converters 140 and current regulators 150 may be switchably connected to the first, second, and third EPTO 161, 162, 163, connections in order to operate as many pieces of connected equipment as possible from the HV battery system 112, either simultaneously or sequentially, as permitted by the capabilities of the HV battery system 112, as described further below.

Figure 2:
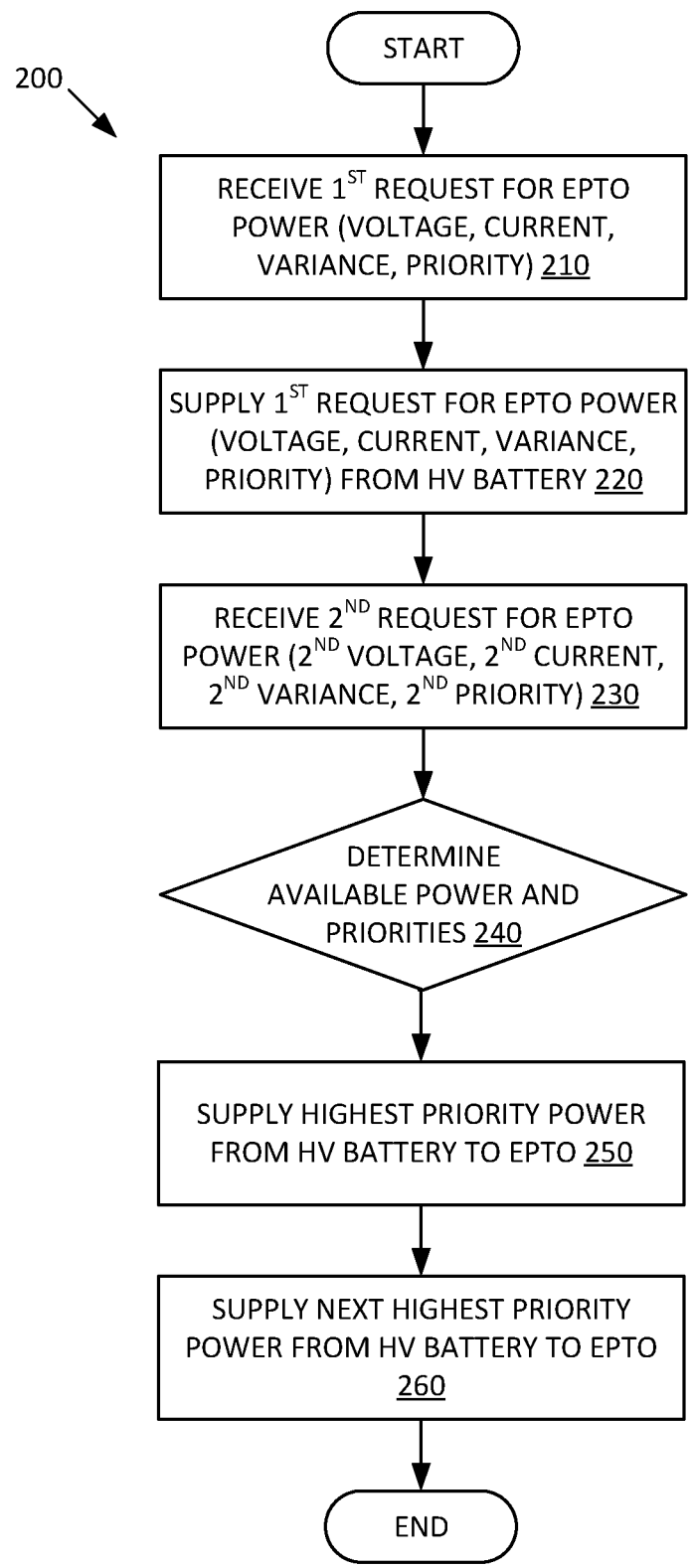
FIG. 2 illustrates an example of an example process flow for providing an electric power take-off.

With reference to FIG. 2, a process flow 200 for providing electric power take-off from a high-voltage electric battery to a plurality of pieces of equipment is illustrated. The process flow 200 may start in a first block 210, wherein computer 104 receives a first request from a first piece of equipment 171 having a first priority for a supply of power from EPTO 161 connector at a first voltage, a first current, and a first variance tolerance. The first priority may be determined based upon a criteria including a user-assigned priority, a device-assigned priority, or first-come first-served priority. A user-assigned or device-assigned priority may be included in the first request or may be assigned to the first external device and saved in memory 105. A first-come first-served priority of the first request can be assigned by computer 104 and saved in memory 105 based upon the order of requests or associated connections. In use, it may be desirable to have certain device priorities override all others so that a piece of equipment will be available for operation when required by a user.

In a next block 220, since the first request is the only request, the computer 104 may control the HV variable DCDC converter 140 and the current regulator 150 to supply the requested power (i.c., voltage, current, variance tolerance) from the HV battery system 112 to the first EPTO 616 connector for first piece of equipment 171.

In a next block 230, the computer 104 receives a second request from a second external device 172 having a second priority for supply of power at a second voltage, a second current, and a second variance tolerance.

Since the computer 104 now has multiple requests for EPTO, the priorities and variance tolerances for the multiple requests should now be considered in light of the SOC of the HV battery, the architecture (i.e., number of cells, bus voltage, temperature control, etc.), and the boost and/or buck capabilities of the one or more HV variable DCDC converters 140. As used herein, "boost" refers to the capability of the HV variable DCDC converter 140 to increase a voltage from the HV battery and "buck" refers to the capability of the HV variable DCDC converter 140 to decrease a voltage from the HV battery.

Accordingly, at decision block 240, the computer 104 determines the available power and priorities based upon one of the criteria mentioned above. The computer then assigns available power from a high-voltage battery to the first and second pieces of equipment based upon their respective priorities and variance tolerances. In certain cases, a requested voltage, current, and/or variance tolerance may not be possible based upon the SOC or architecture of the HV battery and/or the boost/buck capability of the HV variable DCDC converter, and a user may be notified of this via communication module 110 and user device 180 or via HMI 106. In such cases, the priority of the device associated with the request is not further considered in ordering the priorities.

At a next block 250, the computer 104 controls the HV variable DCDC converter 140 and the current regulator 150 to supply the power from the HV battery system 112 to an EPTO connector associated with the request having the highest priority that can be provided within the variance tolerances.

At a next block 260, the computer 104 controls the HV variable DCDC converter 140 and the current regulator 150 to supply the power from the HV battery system 112 to an EPTO connector associated with the request having the next highest priority that can be provided within the variance tolerances.

When only one HV variable DCDC converter 140 is provided and the first and second requests involve different voltages, the requests are fulfilled sequentially. When only one HV variable DCDC converter 140 is provided and the first and second requests involve the same voltage, the requests may be fulfilled concurrently if the current variance can be satisfied or may be supplied sequentially. When multiple HV variable DCDC converters 140 are provided, the first and second requests may be fulfilled concurrently (i.e., at a same time) if the HV battery has the capability or may be supplied sequentially (i.e., one after the other) to reduce load on the HV battery or when the HV battery does not have the capability to supply the power concurrently within the variance tolerance.

Figure 3:
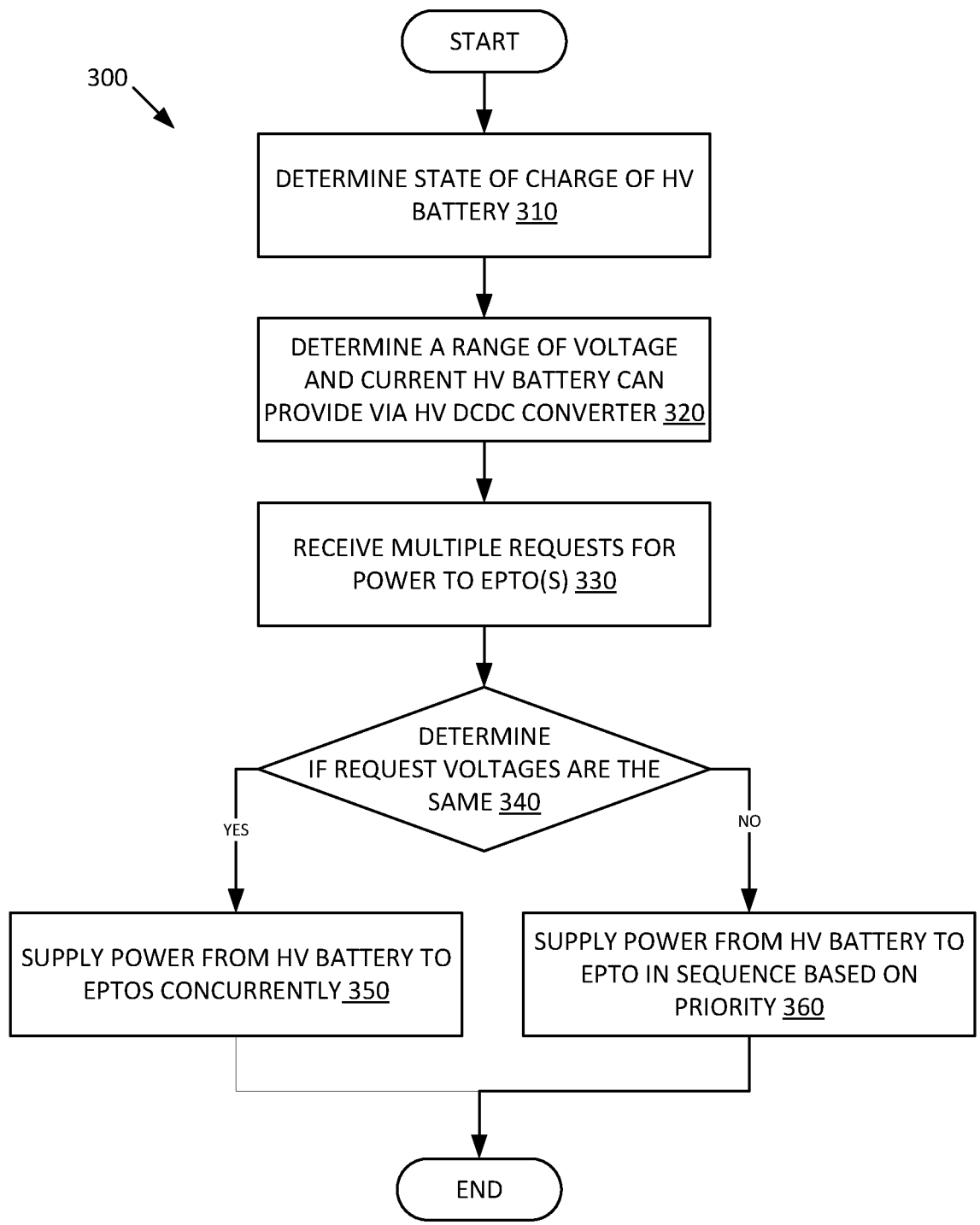
FIG. 3 illustrates another example of process flow providing an electric power take-off.

With reference to FIG. 3, a process flow 300 for providing electric power take-off from a high-voltage electric battery to a plurality of pieces of equipment using a single HV variable DCDC converter 140 is illustrated.

The process flow 300 may start in a first block 310, wherein computer 104 receives data from HV battery system 112 to determine a state of charge (SOC) of the HV battery.

In a next block 320, computer 104 determines a range of voltages and current that the HV battery can provide via the HV variable DCDC converter 140. For example, an 800 V battery with a full charge may be able to supply voltage between 12-800 V over a range from 5-20 kW via the HV variable DCDC converter 140 based upon the HV battery architecture and the buck/boost capabilities of the HV variable DCDC converter 140.

In block 330, the computer 104 receives multiple requests for power to be supplied to one or more EPTOs, as disclosed in the process flow of FIG. 2.

In decision block 340, the computer 104 determines whether the requested voltages are at the same level such that the HV variable DCDC converter 140 can provide the requested voltage and current within the variance tolerance.

When the result of decision block 340 is "YES", the computer 104 provides control signals to the HV variable DCDC converter 140 to supply power from the HV battery to a plurality of EPTOs concurrently at block 350.

When the result of decision block 340 is "NO", the computer 104 provides control signals to the HV variable DCDC converter 140 to supply power from the HV battery to one or more EPTOs sequentially based upon the request priority and variance tolerance at block 350.

In use, the computer 104 can communicate with pieces of equipment that are attached to an EPTO and can receive the initial requests. During communication, the computer 104 can ping the equipment and, in response, the equipment (e.g., 171, 172) can use Ethernet or wireless communication to command, verify, and/or modify supply voltage within available range (e.g., 12-800V) and current against the total power capacity of the HV battery. CAN/Ethernet communication through upfitter IOA 114 can also be used between the equipment 171, 172 and the computer 104. Pinging frequency by the computer 104 can be low when power is not being used, and can increase in frequency during usage and in order to meet the variable DC depends of certain equipment.

The computer can also use voltage and/or current validation if the equipment 171, 172 has a current and/or voltage sensor. For example, the computer 104 can determine which piece of equipment is connected to each EPTO 161, 162, 163 connection by matching the equipment's voltage and/or current with that which is provided.

Based on the request of the equipment, the computer 104 will attempt to meet the voltage/current requests of each device independently and in sequence as prioritized. Also, included in the request, there will be a variance tolerance or tolerances regarding how much the voltage and/or current can vary from the request and still be acceptable in case the system is unable to meet the request.

If only a single HV variable DCDC converter 140 is to be used but multiple loads, e.g., multiple pieces of equipment, are connected with different input voltage requirements, the computer 104 can issue control signals to switch between equipment 171, 172 that is already connected to EPTO 161, 162 connections based on (i) user request, (ii) a priority assigned with each piece of equipment, (iii) first-come first-serve basis, or (iv) acceptable range which changes the device priority within the capacity available to meet a singular source's voltage command. If all pieces of equipment 171, 172 desire the same input voltage, then multiple pieces of equipment 717, 172 can be powered simultaneously.

For any DC equipment that is being directly controlled via feedback & DC voltage (conveyors, hoist, etc.) the system may use a tunable gain through a proportional-integral-derivative (PID) controller to help with control stability.

As needed, based on requested voltage as verified by the computer 104, the computer can assign power to each piece of equipment 171, 172 based on assigned priority and to meet the device variance tolerance requirements. If the computer 104 is unable to meet the current and/or voltage demands within the specified variance tolerance, the system will not provide that piece of equipment with electricity and inform the user via the HMI 106 or user device 180 regarding the limitation. The computer 104 can instruct the user to increase the tolerance bands, shut off other devices, or to charge the HV battery system 112 depending on why the computer 104 was unable to meet the current and/or voltage command.

Based on which EPTO 161, 162, 163 connectors are being used, the computer 104 will open or close sets of contactors in each the EPTO 161, 162, 163 connectors as needed to ensure proper isolation between pieces of equipment. Contactors can be open unless the system is in use or about to be used. Each of the EPTO 161, 162, 163 connectors may have their own set of contactors.

For example, in a system having three EPTO 161, 162, 163 connections and a single HV variable DCDC converter 140, device 1 requesting 200 V at 30 Amps (A) with a highest priority may be connected to EPTO 161 connection, device 2 requesting 500 V at 10 A with a second highest priority may be connected to EPTO 162 connection, and device 3 requesting 700 V at 30 A with a third highest priority may be connected to EPTO 163 connection. The computer 104 can close contactors on EPTO 161 connection and leave the contactors for EPTO 162, 163 connections open, and the computer 104 is thus able to meet the request from device 1. The requests from devices 2 and 3 can be addressed in their priority order.

During usage, the computer 104 can measure voltage before and after the HV variable DCDC converter 140, the equipment 171, 172 can measure the input voltage to ensure the EPTO 161, 162 connection is delivering voltage consistent with the equipment 171, 172 commands. If not, an error term and associated PID controller can be used to correct for the error through a feedback term.

In another example, a system may include a HV battery with an SOC of 93.2%, a bus voltage of 715.9 V, a power capacity of up to 250 KW, and three separate HV variable DCDC converters 140 capable of providing between 200 V and 715.9 V to each of EPTO 161, 162, 163 connections, with EPTO 161 connection capable of up to 50 A, EPTO 162 connection capable of up to 40 A, and EPTO 161 connection capable of up to 100 A. A device 1 requesting 200 V at 30 A with a highest priority may be connected to EPTO 161 connection, device 2 requesting 500 V at 10 A with a second highest priority may be connected to EPTO 162 connection, and device 3 requesting 700 V at 30 A with a third highest priority may be connected to EPTO 163 connection. The computer 104 may determine that all requests can be fulfilled and close the contactors for the EPTO 161, 162, 163 connections. If the SOC does not permit all requests to be fulfilled, the highest priority requests that can be fulfilled are connected first (with a message to the user regarding unfulfilled requests).

While disclosed above with respect to certain implementations, various other implementations are possible without departing from the current disclosure.

Use of in response to, based on, and upon determining herein indicates a causal relationship, not merely a temporal relationship. Further, all terms used in the claims are intended to be given their plain and ordinary meanings as understood by those skilled in the art unless an explicit indication to the contrary is made herein. Use of the singular articles "a," "the," etc. should be read to recite one or more of the indicated elements unless a claim recites an explicit limitation to the contrary.

With regard to the media, processes, systems, methods, etc. described herein, it should be understood that, although the steps of such processes, etc. have been described as occurring according to a certain ordered sequence, unless indicated otherwise or clear from context, such processes could be practiced with the described steps performed in an order other than the order described herein. Likewise, it further should be understood that certain steps could be performed simultaneously, that other steps could be added, or that certain steps described herein could be omitted. In other words, the descriptions of processes herein are provided for the purpose of illustrating certain implementations and should in no way be construed so as to limit the present disclosure.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. A system, comprising:
   a computing device having a processor and a memory, wherein the memory stores instructions executable by the processor such that the computing device is programmed to:
   receive a first request from a first external device having a first priority for supply of power from an electric power take-off connector at a first voltage, a first current, and a first variance tolerance;
   receive a second request from a second external device having a second priority for supply of power at a second voltage, second current, and a second variance tolerance; and
   assign available power from a high-voltage electric battery, via a high voltage (HV) variable direct-current to direct-current (DCDC) converter and a current regulator, to the first and second external devices based upon their respective priorities and variance tolerances.

2. The system of claim 1, further comprising instructions executable by the processor such that the computing device is programmed to determine a range of voltage and current available from the high-voltage electric battery, a state of charge (SOC) of the high-voltage electric battery, and a boost/buck capability of the HV variable DCDC converter.

3. The system of claim 1, wherein respective priorities are determined based upon a criteria including a user-assigned priority, a device-assigned priority, or first-come first-served priority.

4. The system of claim 1, further comprising instructions executable by the processor such that the computing device is programmed to ping the first and second external devices in order to receive the first and second requests.

5. The system of claim 2, further comprising instructions executable by the processor such that the computing device is programmed to assign available power to the first and second external devices sequentially.

6. The system of claim 2, wherein a first electric power take-off connector is provided for the first external device and a second electric power take-off connector is provided for the second external device; and
   further comprising instructions executable by the processor such that the computing device is programmed to:
   assign available power to the first and second external devices concurrently when the first voltage and the second voltage are identical.

7. The system of claim 1, wherein data is exchanged with external devices wirelessly.

8. The system of claim 1, wherein data is exchanged with external devices over a controller area network (CAN) or Ethernet.

9. The system of claim 1, wherein the HV variable DCDC converter operates between 12 volts and 800 volts.

10. The system of claim 2, wherein the instructions executable by the processor are programmed to arbitrate available power to the first external device using the HV variable DCDC converter and the current regulator and to the second external device using a second HV variable DCDC converter and a second current regulator.

11. A method, comprising:
    receiving a first request from a first external device having a first priority for a supply of power from an electric power take-off connector at a first voltage, a first current, and a first variance tolerance;
    receiving a second request from a second external device having a second priority for supply of power at a second voltage, a second current, and a second variance tolerance; and
    assigning available power from a high-voltage battery, via a high voltage (HV) variable direct-current to direct-current (DCDC) converter and a current regulator in electrical communication with the high-voltage battery, to the first and second external devices based upon their respective priorities and variance tolerances.

12. The method of claim 11, further comprising:
    determining a range of voltage and current available from the high-voltage electric battery, a state of charge (SOC) of the high-voltage electric battery, and a boost/buck capability of the HV variable DCDC converter.

13. The method of claim 11, wherein respective priorities are determined based upon a criteria including a user-assigned priority, a device-assigned priority, or first-come first-served priority.

14. The method of claim 11, further comprising:
    pinging the first and second external devices in order to receive the first and second requests.

15. The method of claim 12, further comprising:
    assigning available power to the first and second external devices sequentially.

16. The method of claim 12, further comprising:
    providing a first electric power take-off connector for the first external device and a second electric power take-off connector for the second external device; and
    assigning available power to the first and second external devices concurrently when the first voltage and the second voltage are identical.

17. The method of claim 11, wherein data is exchanged with external devices wirelessly.

18. The method of claim 11, wherein data is exchanged with external devices over a controller area network (CAN) or Ethernet.

19. The method of claim 11, wherein the HV variable DCDC converter operates between 12 volts and 800 volts.

20. The method of claim 12, further comprising:
    arbitrate available power to the first external device using the HV variable DCDC converter and the current regulator and to the second external device using a second HV variable DCDC converter and a second current regulator.

* * * * *